United States Patent
Niemackl

(10) Patent No.: US 9,316,888 B1
(45) Date of Patent: Apr. 19, 2016

(54) CAMERA MOUNT WITH BLIND

(71) Applicant: Douglas J. Niemackl, Topeka, KS (US)

(72) Inventor: Douglas J. Niemackl, Topeka, KS (US)

( * ) Notice: Subject to any disclaimer, the term of this patent is extended or adjusted under 35 U.S.C. 154(b) by 0 days.

(21) Appl. No.: 14/923,065

(22) Filed: Oct. 26, 2015

(51) Int. Cl.
*G03B 17/56* (2006.01)
*G03B 29/00* (2006.01)

(52) U.S. Cl.
CPC ............ *G03B 17/568* (2013.01); *G03B 17/561* (2013.01); *G03B 17/566* (2013.01); *G03B 29/00* (2013.01)

(58) Field of Classification Search
CPC .... G03B 17/56; G03B 17/561; G03B 17/566; G03B 17/568; G03B 29/00
See application file for complete search history.

(56) References Cited

U.S. PATENT DOCUMENTS

| | | | | |
|---|---|---|---|---|
| 1,099,820 A | * | 6/1914 | Ridings | G03B 17/53 359/871 |
| 3,672,269 A | * | 6/1972 | Tabankin | G03B 29/00 396/427 |
| 4,771,300 A | * | 9/1988 | Bryan | G03B 15/06 359/839 |
| 7,275,532 B2 | | 10/2007 | Niemackl | |

\* cited by examiner

*Primary Examiner* — WB Perkey
(74) *Attorney, Agent, or Firm* — Head, Johnson & Kachigian, P.C.

(57) ABSTRACT

A camera mount with a base and a cantilever platform for attaching a camouflage blind assembly to a camera. The camera may be secured to the platform, while the blind assembly may be attached to the base. The base may be mounted atop a tripod or other support device, or may be held by the user. The camera mount allows the user to take images of wildlife without the wildlife seeing the user or the camera. This allows the user to approach the wildlife closer than would otherwise be possible, resulting in closer, clearer images.

13 Claims, 6 Drawing Sheets

CAMERA MOUNT WITH BLIND

CROSS REFERENCE

Not Applicable.

BACKGROUND OF THE INVENTION

1. Field of the Invention

This invention relates generally to a camera mount with a blind for camouflaging a camera user.

2. Description of the Related Art

In bow hunting, getting close enough to a game animal for making an effective shot usually requires some form of cover between the pursued animal and its pursuer. Good natural cover is rare. The Hide-A-Bow, described in U.S. Pat. No. 7,275,532, issued Oct. 2, 2007 to Niemackl, addresses this problem.

The problem of how to approach wildlife unobserved is equally important to wildlife photographers. The closer the photographer can get to his or her subject, the higher the possible resolution of the resulting photograph. Furthermore, ideally, a high quality camera should be mounted for stability and to allow proper adjustment and focusing of the camera prior to taking a photograph, particularly for long exposure shots. Both the camera and the photographer should be hidden from view while the photographer is preparing for and taking the photographs to allow the closest shots and highest quality photographs.

Based on the foregoing, it is desirable to provide a camera mount with a blind similar to the Hide-A-Bow, but specifically adapted for cameras rather than compound bows.

It is further desirable for the camera mount to provide camouflage to the camera and the photographer during use.

It is further desirable for the camera mount to provide stability and to allow hands-free use of the camera by the photographer.

It is further desirable for the camera mount and blind to be uncomplicated, lightweight, portable, and easy to use.

SUMMARY OF THE INVENTION

In general, in a first aspect, the invention relates to a camera blind comprising a camera mount and a camouflaged panel. The camera mount may be adapted for attachment to a camera and may comprise: a base with a front, a back, a top, and a bottom, where the base has a pair of apertures in the top; a platform extending cantileverly from the back of the base, where the platform has an elongate opening therethrough such that a camera may be secured atop the platform by extending an attachment device through the opening and into a corresponding receptacle in the camera; and at least one bracket extending from the front of the base. The camouflaged panel may be releasably secured to the camera mount and may comprise: a flexible sheet with a top, a bottom, and two sides; a first horizontal sleeve positioned at the top of the flexible sheet and running laterally between the two sides; a second horizontal sleeve positioned partway between the top and the bottom of the flexible sheet or at the bottom of the flexible sheet and running laterally between the two sides; a first stiffening rod located in the first horizontal sleeve; a pair of support arms, each of the support arms having a first end and a second end, the second end of each of the support arms being pivotally fastened to the first stiffening rod, and said first end of each of said first pair of support arms being removably positioned within the pair of apertures in the base of the camera mount; and a second stiffening rod located in the second horizontal sleeve, where the second horizontal sleeve is positioned such that the second stiffening rod fits within the bracket on the camera mount with the flexible sheet held taut.

The camera blind may further comprise a fastening assembly on the bottom of the base for mounting the base to a tripod and/or a pair of apertures in the bottom of the base and a pair of support arms removably receivable within the apertures in the bottom of the base. The attachment device for attaching the camera to the platform may comprise a post with a threaded end and an opposing spacer and knob. The camera blind may further comprise an area of high friction material atop the platform and/or atop the base. The at least one bracket extending from the front of the base may comprise two generally rectangular brackets, where each bracket has a generally triangular cross section with a bottom leg lying in a plane perpendicular to a back leg, where the brackets are parallel such that both bottom legs lie in the same plane, and where each bottom leg has an arcuate indentation such that the second stiffening rod may be received laterally into the indentations of both brackets simultaneously.

In a second embodiment, the invention relates to the camera mount alone, where the camera mount is for use with a blind assembly. The camera mount may comprise: a base with a front, a back, a top, and a bottom, where the base has a pair of apertures in the top for receiving the blind assembly; a platform extending cantileverly from the back of the base, where the platform has an elongate opening therethrough such that a camera may be secured atop the platform by extending an attachment device through the opening and into a corresponding receptacle in the camera; and at least one bracket extending from the front of the base for securing the blind assembly. The camera mount may further comprise a fastening assembly on the bottom of the base for mounting the base to a tripod and/or a pair of apertures in the bottom of the base and a pair of support arms removably receivable within the apertures in the bottom of the base. The attachment device for attaching the camera to the platform may comprise a post with a threaded end and an opposing spacer and knob. The camera mount may further comprise an area of high friction material atop the platform and/or atop the base.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
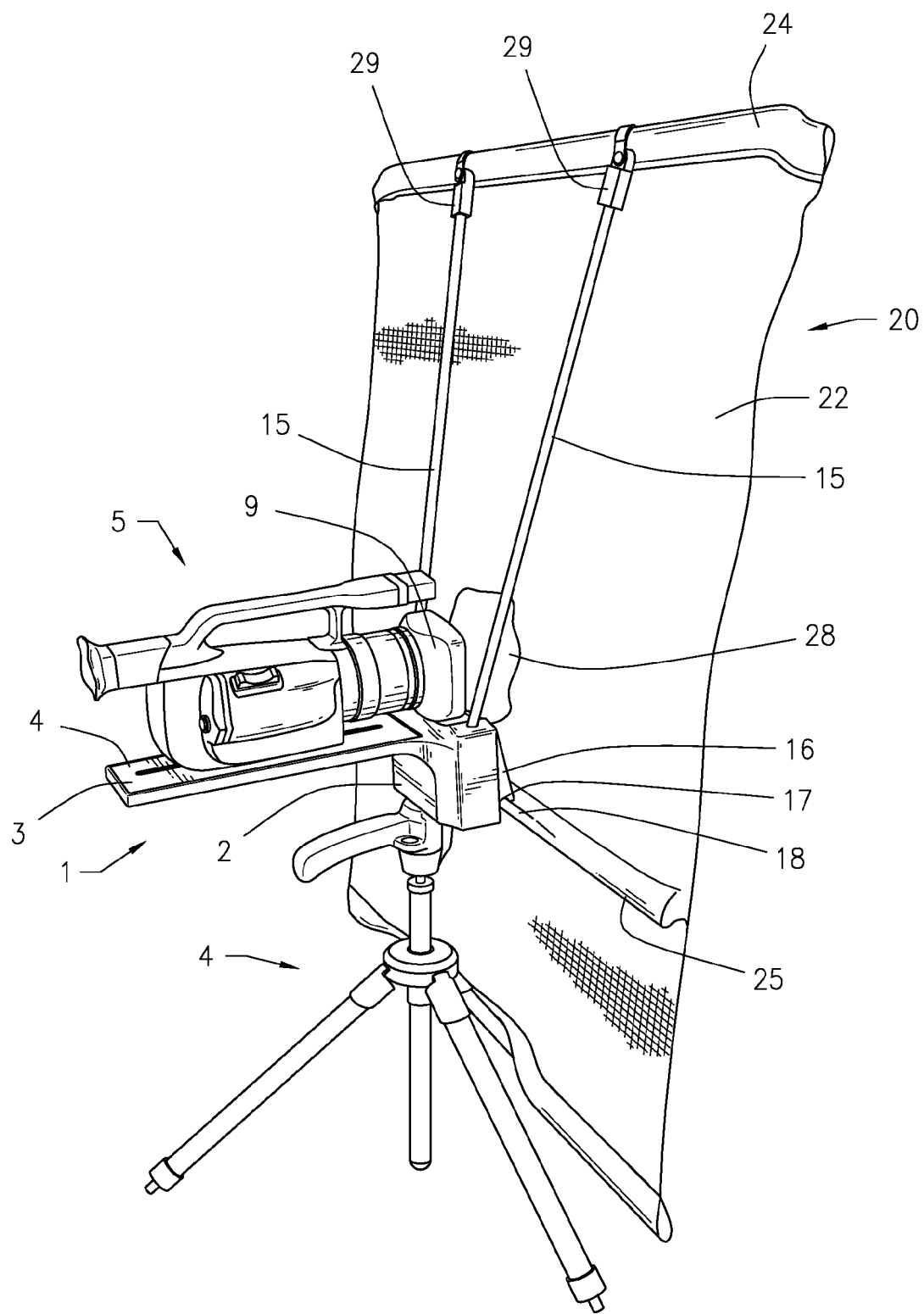
FIG. 1 is a perspective view of the camera mount with the blind assembly and camera attached thereto.
Figure 2:
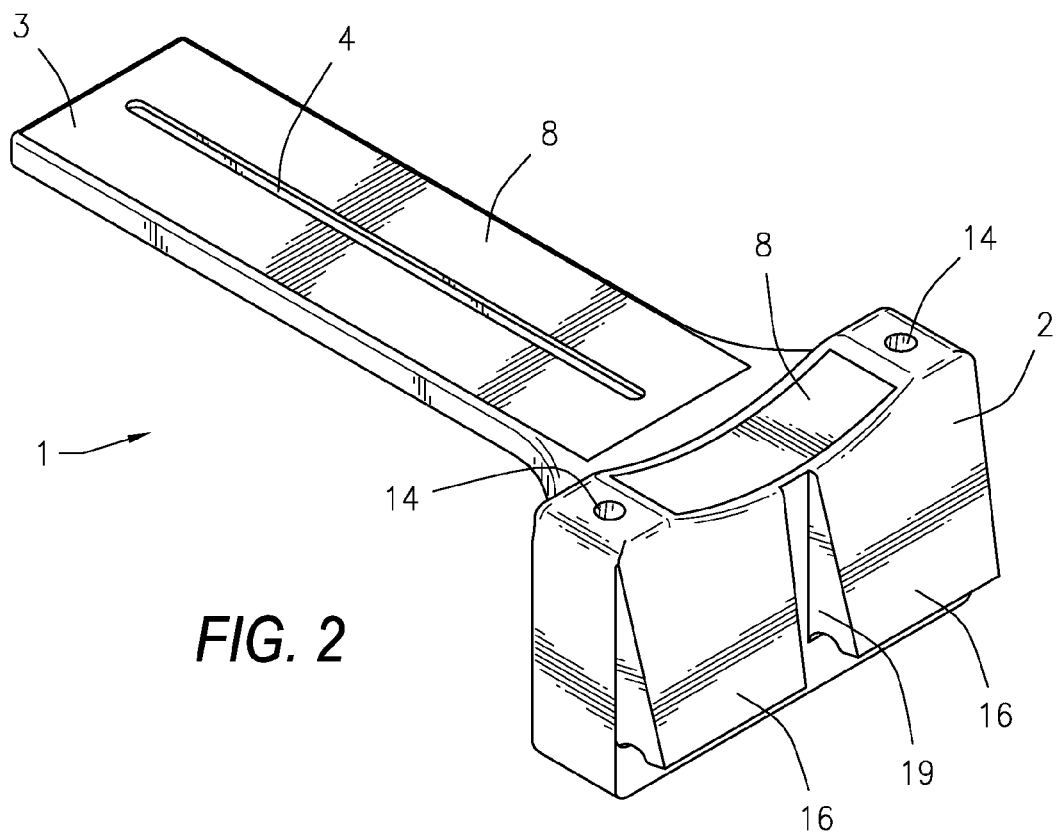
FIG. 2 is a perspective view of the camera mount.
Figure 3:
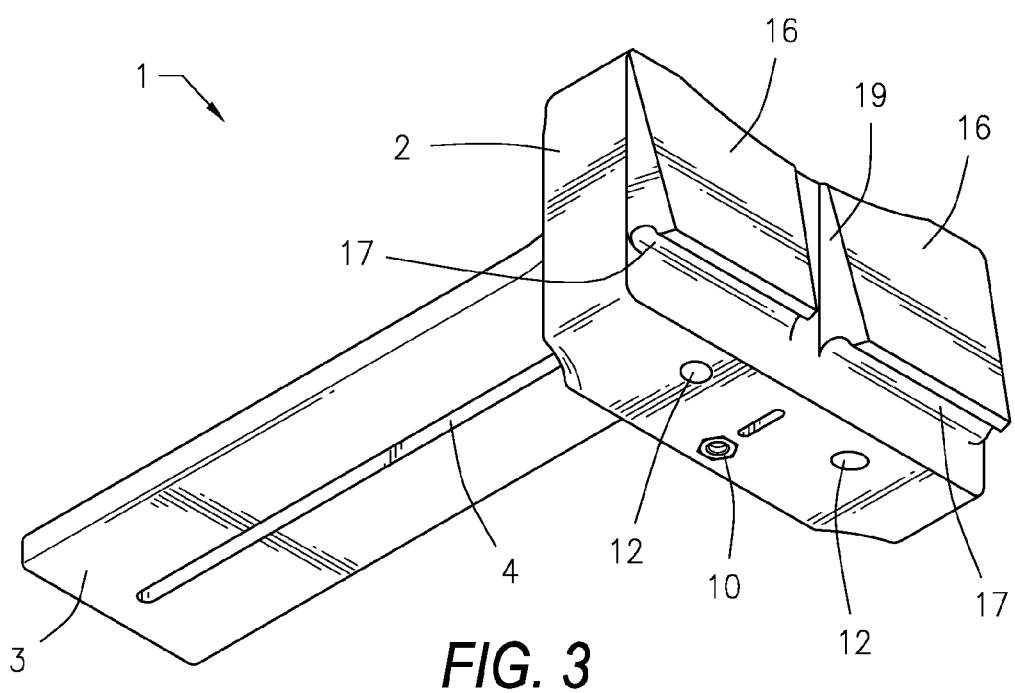
FIG. 3 is a different perspective view of the camera mount.
Figure 4:
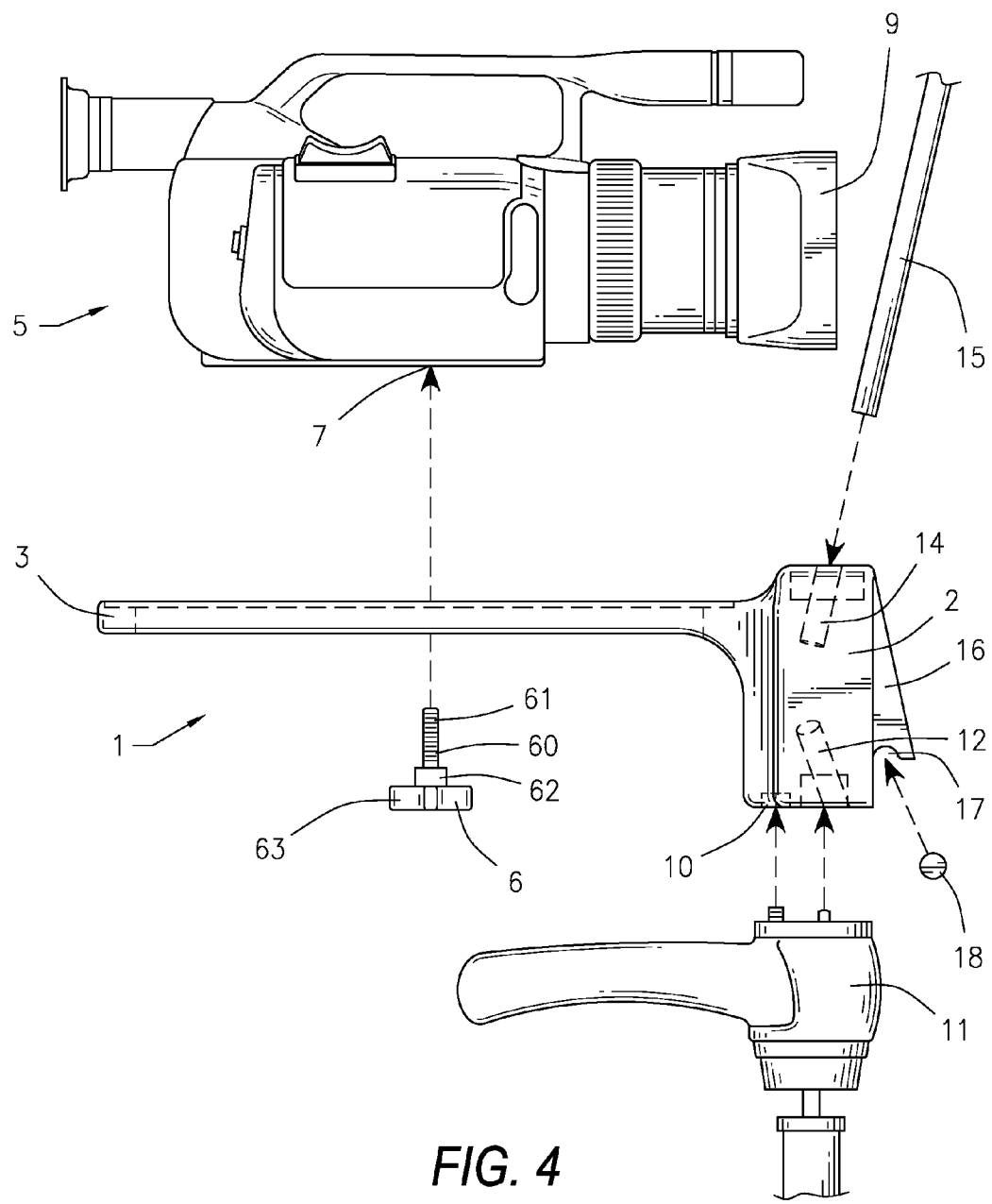
FIG. 4 is an exploded side view of the camera mount, camera, tripod base, and blind assembly rods.
Figure 5:
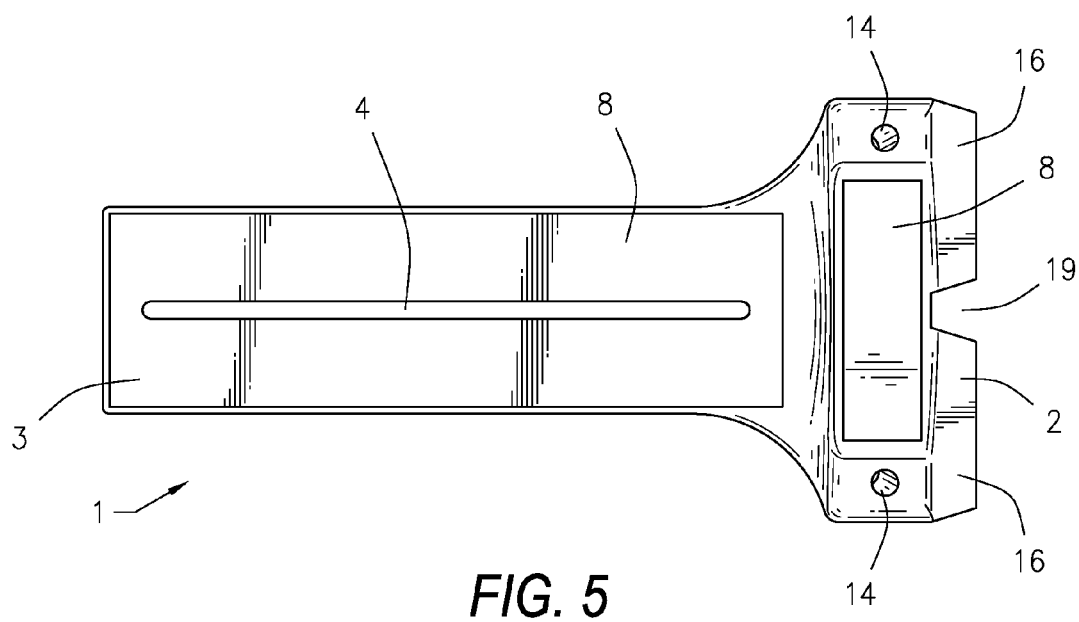
FIG. 5 is a top view of the camera mount.
Figure 6:
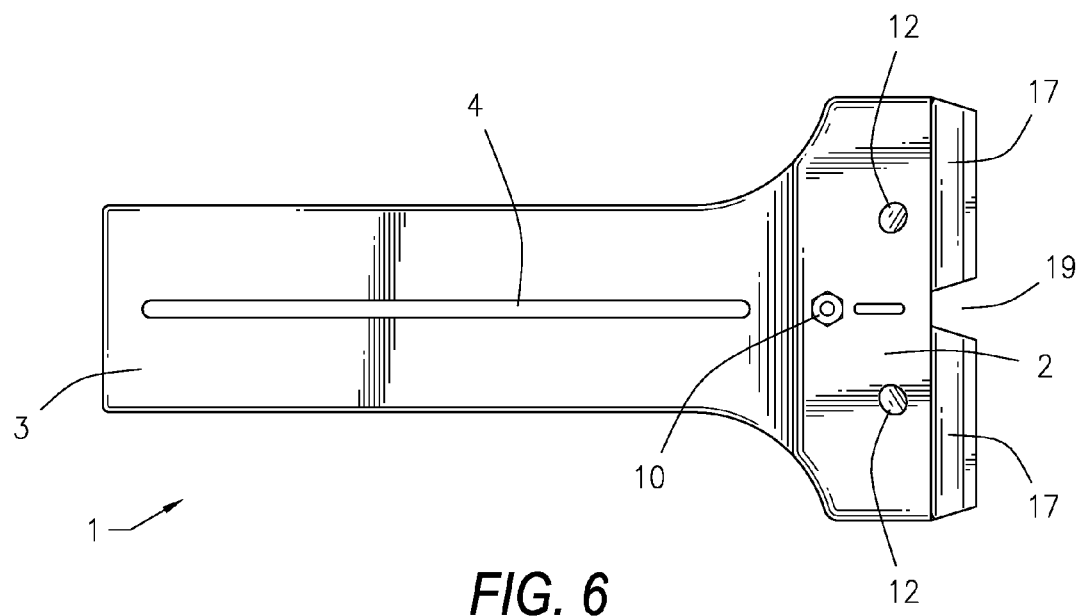
FIG. 6 is a bottom view of the camera mount.
Figure 7:
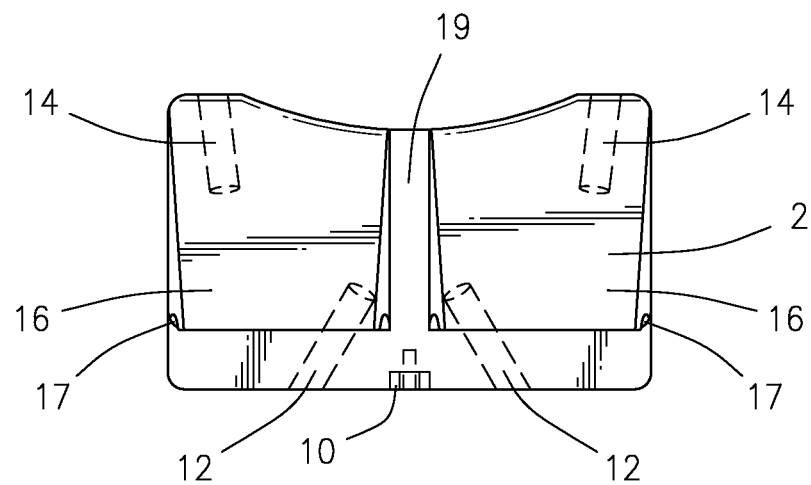
FIG. 7 is a front view of the camera mount.
Figure 8:
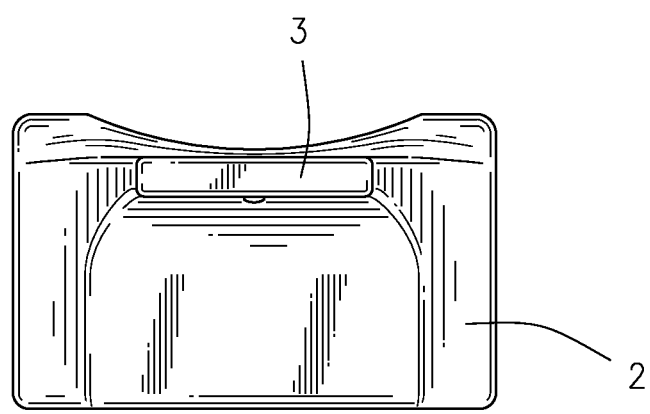
FIG. 8 is a back view of the camera mount.
Figure 9:
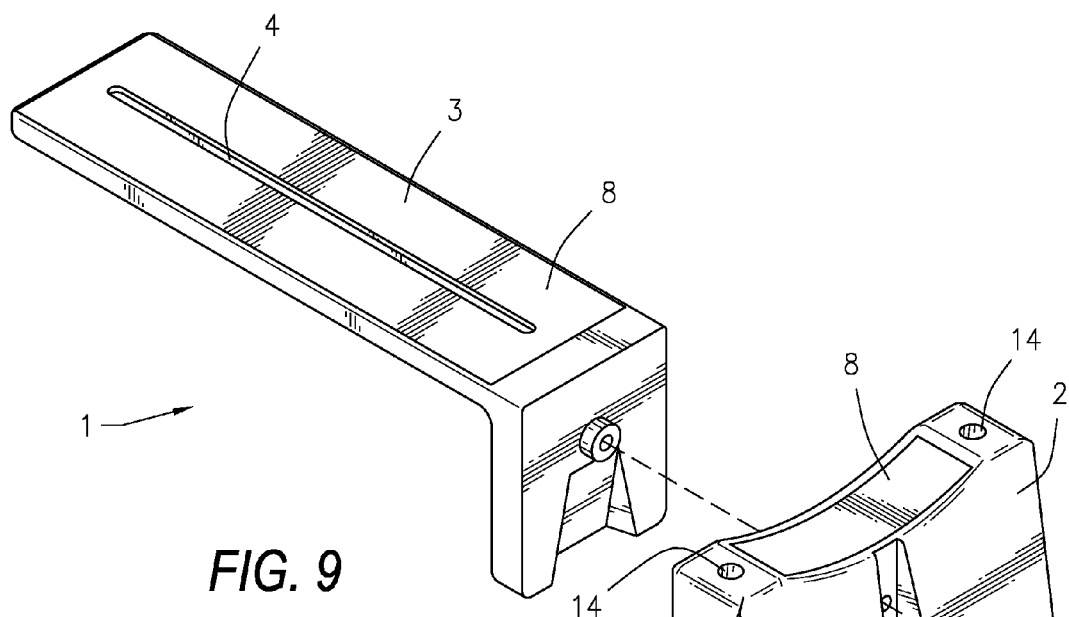
FIG. 9 is a perspective view of the camera mount with a two-part configuration.
Figure 10:
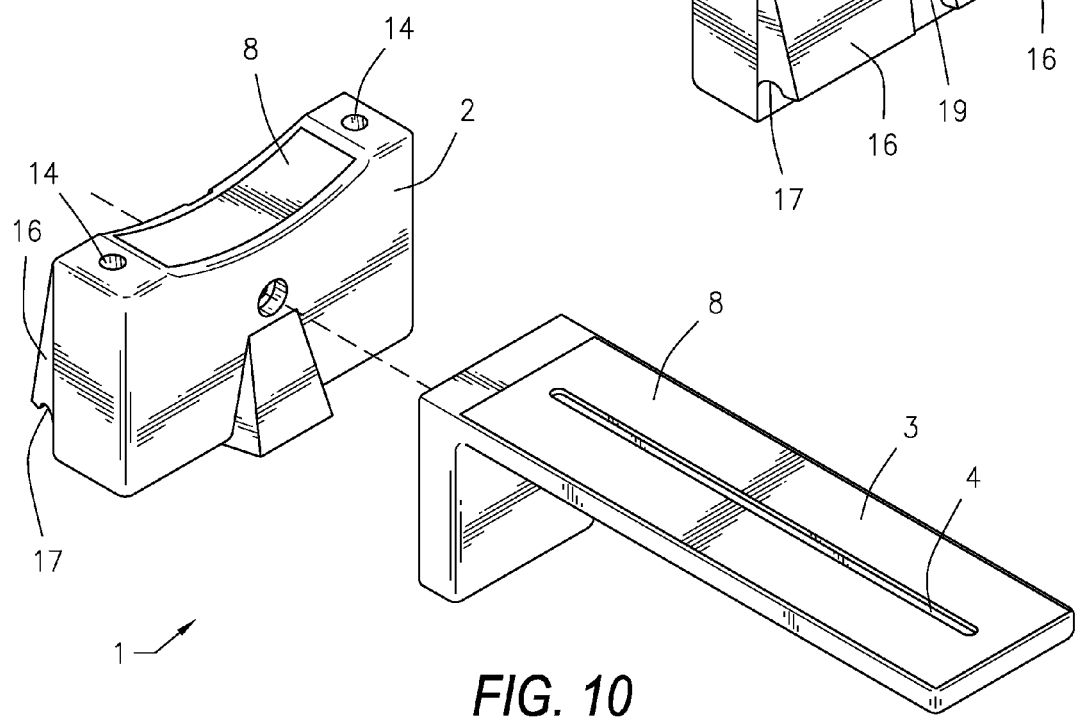
FIG. 10 is a different perspective view of the camera mount with a two-part configuration.

In general, in a first aspect, the invention relates to a camera mount 1 comprising a base 2 and a platform 3. The base 2 and platform 3 may be of unitary construction, as shown in FIGS. 1 through 8, or may be separate components joined as shown in FIGS. 9 and 10. The platform 3 may be elongate and may have an elongate opening 4 therethrough. In use, a camera 5 may be placed atop the platform 3 and an attachment device 6, such as a standard camera mount screw or pin, may extend through the opening 4 to be received in a corresponding receptacle 7, such as a standard threaded hole, in the bottom of the camera 5, thus securing the camera 5 in place relative to the platform 3. The attachment device 6 may be a post 60 with a threaded end 61 and an opposing spacer 62 and knob 63, as shown. The fact that the opening 4 may be elongate allows the user to place and secure the camera 5 anywhere along the opening 4 as desired, thus accommodating various camera sizes, configurations, and placements.

The platform 3 may project from the back of the base 2 as a cantilever. The platform 3 may be attached to the base 2 or the base 2 and platform 3 may be unitarily formed. The base 2 may be generally rectangular, as shown, or any other desired shape. The top of the platform 3 and/or the top of the base 2 may have an area 8 of high friction material, thus providing a non-slip surface upon which the camera 5 may rest. The areas 8 may optionally be soft or padded and/or contoured, as shown, to gently hold the camera 5 and its lens 9.

The base 2 may have a fastening assembly 10, such as a threaded bolt in an aperture, for mounting the base 2 on a standard tripod 11. The base 2 may additionally or alternately have two cylindrical openings 12 extending from the bottom of the base 2 upward at an angle. The openings 12 may be equally spaced from the center of the base 2 and may both angle upward toward the center of the base 2 with the same slope as each other. The openings 12 may also angle upward toward the back of the base 2 with the same slope as each other. Support arms (not shown) may be receivable within the openings 12.

The base 2 may have two cylindrical openings 14 extending from the top of the base 2 downward at an angle. The openings 14 may be equally spaced from the center of the base 2 and may both angle downward toward the center of the base 2 with the same slope as each other. The openings 14 may also angle downward toward the back of the base 2 with the same slope as each other. Support arms 15 may be receivable within the openings 14.

The base 2 may have a pair of brackets 16 extending forwardly from the base 2. Each bracket 16 may be generally rectangular with a generally triangular cross section, such that the bottom of the bracket 16 extends from the front of the base 2 further than the top of the bracket 16. The brackets 16 may be attached to or integrally formed with the base 2. The bottom of each bracket 16 may have an arcuate indentation 17 into which a tube 18 may be receivable laterally. The two brackets 16 may be aligned such that the arcuate indentations 17 align, such that a single tube 18 may be received laterally into both arcuate indentations 17. A groove 19 may run vertically between the two brackets 16. Alternately, the pair of brackets 16 may comprise a pair of downturned hooks.

A camouflaged panel 20 may be secured to the base 2 via the support arms 15 and brackets 16. Support arms 15 may be small-gauge tubes of metal, plastic, fiberglass, graphite, or other suitable material. A first end of each support arm 15 may be inserted in openings 14 and held in place by friction and gravity. Friction may be increased by an inward torque applied to arms 15 by an elastomeric band or spring (not shown) connecting their midpoints. Since openings 14 angle downward toward the back of the base 2, support arms 15 may project well forward of the base 2 and camera 5. Such an arrangement permits panel 20 to be held at a distance from the camera 5 so that it will not impede the view through the lens 9 of the camera 5.

Camouflage panel 20 may include a sheet 22 of fabric or other material having indicia 23 on its front that tends to blend sheet 22, and the photographer shielded behind it, into the environment. Such indicia 23 may include images of animals or patterns simulative of brush, rocks, or dirt, among other things. Sheet 22 need not be unitary in its construction and can, if desired, be a patchwork of numerous smaller elements meant to hang loosely and sway in the breeze in the manner of leaves. Sheet 22 may be generally rectangular, as shown, or any desired shape, such as an animal shape.

Sheet 22 may be provided with a pair of horizontal sleeves 24 and 25 for receiving stiffening rods therein. Sleeve 24 may be located along the top of sheet 22 and may extend from one side of sheet 22 to the other. Sleeve 25 may likewise extend from one side of sheet 22 to the other, but may be located partway between the top and bottom of sheet 22. Sleeve 25 may be parallel to sleeve 24. Above sleeve 25 may be an opening 28 in sheet 22 through which the camera 5 may capture images unimpeded by the sheet 22.

Stiffening rods housed within sleeves 24 and 25 may maintain sheet 22 in an outstretched and substantially planar configuration when deployed. Brackets 29 may connect the panel 20 to the outer ends of support arms 15. Tube 18 may act as the stiffening rod within sleeve 25. The arcuate indentations 17 of brackets 16 may catch and press downwardly upon the top of tube 18 near the midpoint thereof, thus holding the sheet 22 in place relative to the base 2 and the camera 5, with the opening 28 in the sheet 22 proximate the camera lens 9.

During use, the user may rest the camera 5 atop the platform 3 and extend attachment device 6 through the elongate opening 4 in the platform 3 and into the corresponding receptacle 7 in the bottom of the camera 5, thus attaching the camera to the platform. The user may attach a tripod 11 or support arms to the base 2 to support the camera mount 1. Alternately, the user may omit the tripod 11 or support arms 13 and hold the camera 5 or camera mount 1 itself during use. The user may place the first ends of support arms 15 into openings 14, allowing the sheet 22 to hang in front of the camera mount 1. The user may place stiffening rod/tube 18, already within sleeve 25, into the arcuate indentations 17 of brackets 16 to hold the sheet 22 in place relative to the camera mount 1. Groove 19 allows the user to hold the tube 18 at its center when placing it within the indentations 17. The user may then position him or herself behind the sheet 22 to capture images with the camera 5 with both the user and the camera 5 hidden from view.

The camera 5 may be used in substantially the same manner with the camera mount 1 and camouflaged panel 20 secured to it as it would be without the camera mount 1 and camouflaged panel 20. The user, however, may be able to approach animals more closely than was formerly the case since the animals may have more difficulty seeing the user. Taking images is accomplished through opening 28 in sheet 22. Since the user is less likely to be detected by the animal while taking the images, the user can take closer, higher resolution images.

To store the device, the camouflaged panel 20 may be removed from the camera mount 1 by removing the stiffening rod/tube 18 from the brackets 16 and then removing the support arms 15 from openings 14. The camouflaged panel 20 may be rolled up for storage or disassembled entirely for smaller storage. The camera mount 1 may be removed from the tripod 11 or support arms, if used, and the camera 5 may be removed from the camera mount 1, if desired, or may be stored in place on the camera mount 1 for easy reuse.

Whereas, the devices and methods have been described in relation to the drawings and claims, it should be understood that other and further modifications, apart from those shown or suggested herein, may be made within the spirit and scope of this invention.

What is claimed is:

1. A camera blind comprising:
   a camera mount being adapted for attachment to a camera, the camera mount comprising:
   a base with a front, a back, a top, and a bottom, where the base has a pair of apertures in the top;
   a platform extending cantileverly from the back of the base, where the platform has an elongate opening therethrough such that a camera may be secured atop the platform by extending an attachment device through the opening and into a corresponding receptacle in the camera; and
   at least one bracket extending from the front of the base; and
   a camouflaged panel being releasably secured to the camera mount, the camouflaged panel comprising:
   a flexible sheet with a top, a bottom, and two sides;
   a first horizontal sleeve positioned at the top of the flexible sheet and running laterally between the two sides;
   a second horizontal sleeve positioned partway between the top and the bottom of the flexible sheet or at the bottom of the flexible sheet and running laterally between the two sides;
   a first stiffening rod located in the first horizontal sleeve;
   a pair of support arms, each of the support arms having a first end and a second end, the second end of each of the support arms being pivotally fastened to the first stiffening rod, and said first end of each of said first pair of support arms being removably positioned within the pair of apertures in the base of the camera mount; and
   a second stiffening rod located in the second horizontal sleeve, where the second horizontal sleeve is positioned such that the second stiffening rod fits within the bracket on the camera mount with the flexible sheet held taut.

2. The camera blind of claim 1 further comprising a fastening assembly on the bottom of the base for mounting the base to a tripod.

3. The camera blind of claim 1 further comprising a pair of apertures in the bottom of the base and a pair of support arms removably receivable within the apertures in the bottom of the base.

4. The camera blind of claim 1 where the attachment device for attaching the camera to the platform comprises a post with a threaded end and an opposing spacer and knob.

5. The camera blind of claim 1 further comprising an area of high friction material atop the platform.

6. The camera blind of claim 5 further comprising a contoured area of high friction material atop the base.

7. The camera blind of claim 1 where the at least one bracket extending from the front of the base comprises two generally rectangular brackets, where each bracket has a generally triangular cross section with a bottom leg lying in a plane perpendicular to a back leg, where the brackets are parallel such that both bottom legs lie in the same plane, and where each bottom leg has an arcuate indentation such that the second stiffening rod may be received laterally into the indentations of both brackets simultaneously.

8. A camera mount for use with a blind assembly, the camera mount comprising:
   a base with a front, a back, a top, and a bottom, where the base has a pair of apertures in the top for receiving the blind assembly;
   a platform extending cantileverly from the back of the base, where the platform has an elongate opening therethrough such that a camera may be secured atop the platform by extending an attachment device through the opening and into a corresponding receptacle in the camera; and
   at least one bracket extending from the front of the base for securing the blind assembly.

9. The camera mount of claim 8 further comprising a fastening assembly on the bottom of the base for mounting the base to a tripod.

10. The camera mount of claim 8 further comprising a pair of apertures in the bottom of the base and a pair of support arms removably receivable within the apertures in the bottom of the base.

11. The camera mount of claim 8 where the attachment device for attaching the camera to the platform comprises a post with a threaded end and an opposing spacer and knob.

12. The camera mount of claim 8 further comprising an area of high friction material atop the platform.

13. The camera mount of claim 12 further comprising a contoured area of high friction material atop the base.

* * * * *